United States Patent
Konermann

(10) Patent No.: US 10,632,651 B2
(45) Date of Patent: Apr. 28, 2020

(54) METHOD OF FILLING A WEIGHING CONTAINER FOR PLASTICS GRANULATE

(71) Applicant: Plast-Control GmbH, Remscheid (DE)

(72) Inventor: Stefan Konermann, Remscheid (DE)

(73) Assignee: Plast-Control GmbH, Remscheid (DE)

( * ) Notice: Subject to any disclaimer, the term of this patent is extended or adjusted under 35 U.S.C. 154(b) by 269 days.

(21) Appl. No.: 15/722,099

(22) Filed: Oct. 2, 2017

(65) Prior Publication Data

US 2018/0104859 A1    Apr. 19, 2018

(30) Foreign Application Priority Data

Oct. 14, 2016   (DE) .................. 10 2016 119 596

(51) Int. Cl.
| | |
|---|---|
| *B29C 31/06* | (2006.01) |
| *B65B 1/32* | (2006.01) |
| *B65B 1/06* | (2006.01) |
| *B29C 31/02* | (2006.01) |
| *G01G 17/00* | (2006.01) |
| *G01G 21/28* | (2006.01) |
| *B29C 48/27* | (2019.01) |
| *B29C 48/285* | (2019.01) |
| *G01G 13/00* | (2006.01) |
| *G01G 15/00* | (2006.01) |
| *B65B 1/28* | (2006.01) |
| *G01G 13/02* | (2006.01) |
| *G01G 13/295* | (2006.01) |

(52) U.S. Cl.
CPC .......... *B29C 31/061* (2013.01); *B29C 31/02* (2013.01); *B29C 48/271* (2019.02); *B29C 48/286* (2019.02); *B29C 48/288* (2019.02); *B65B 1/06* (2013.01); *B65B 1/32* (2013.01); *G01G 13/006* (2013.01); *B65B 1/28* (2013.01); *G01G 13/024* (2013.01); *G01G 13/2952* (2013.01); *G01G 15/00* (2013.01); *G01G 17/00* (2013.01); *G01G 21/28* (2013.01)

(58) Field of Classification Search
CPC ..... B29C 31/02; B29C 31/061; B29C 48/271; B29C 48/286; B29C 48/288; G01G 21/28; G01G 17/00; G01G 15/00; B65B 1/06; B65B 1/28; B65B 1/32
USPC ............................................ 141/83; 177/105
See application file for complete search history.

(56) References Cited

U.S. PATENT DOCUMENTS

| | | | | |
|---|---|---|---|---|
| 2,105,589 | A | * | 1/1938 | Eades .................. B65G 69/182 141/93 |
| 4,312,388 | A | * | 1/1982 | Hager ...................... B65B 1/28 141/1 |

(Continued)

FOREIGN PATENT DOCUMENTS

| | | |
|---|---|---|
| CH | 684902 A5 | 1/1995 |
| DE | 2218360 A | 10/1973 |

(Continued)

*Primary Examiner* — Randy W Gibson
(74) *Attorney, Agent, or Firm* — Richard M. Goldberg

(57) ABSTRACT

The method of filling a weighing container (10) for plastics granulate (12), wherein the granulate is dropped from a supply tube (26) into the weighing container (10) via a shutter (22), wherein the weighing container (10) is closed-off on the top side by a wall having a conical part (16) that reaches directly up the shutter (22), and in that the weighing container is filled with granulate up to the level of the shutter (22).

6 Claims, 4 Drawing Sheets

(56) References Cited

U.S. PATENT DOCUMENTS

| | | | | |
|---|---|---|---|---|
| 4,782,865 A * | 11/1988 | Everman | ................... | B65B 1/22 |
| | | | | 141/114 |
| 4,787,428 A * | 11/1988 | Bacroix | ................... | B67C 3/26 |
| | | | | 137/113 |
| 4,854,353 A * | 8/1989 | Russell | ................... | B65B 1/28 |
| | | | | 141/74 |
| 4,967,813 A * | 11/1990 | Ponvianne | .............. | B67C 3/002 |
| | | | | 141/128 |
| 5,443,102 A * | 8/1995 | Svendsen | .................. | B65B 1/28 |
| | | | | 141/10 |
| 2003/0155035 A1* | 8/2003 | Ichikawa | .................. | B65B 1/16 |
| | | | | 141/301 |
| 2007/0157990 A1* | 7/2007 | Amano | ..................... | B65B 1/16 |
| | | | | 141/83 |
| 2016/0031595 A1* | 2/2016 | Claussen | ............ | B65D 21/0228 |
| | | | | 141/329 |

FOREIGN PATENT DOCUMENTS

| | | | |
|---|---|---|---|
| DE | 3914925 | A1 | 11/1989 |
| DE | 4027319 | A1 | 3/1992 |
| DE | 9418825 | U1 | 5/1996 |
| DE | 10317001 | B3 | 11/2004 |
| DE | 102004016756 | B4 | 7/2006 |
| DE | 102010055153 | A1 | 6/2012 |
| DE | 102013100812 | A1 | 7/2014 |

* cited by examiner

METHOD OF FILLING A WEIGHING CONTAINER FOR PLASTICS GRANULATE

BACKGROUND OF THE INVENTION

The invention relates to a method of filling a weighing container for plastics granulate, wherein the granulate is dropped from a supply tube into the weighing container via a shutter.

A method of this type has been disclosed in DE 10 2004 016 756 B4.

Weighing containers are used in the plastics processing industry for precisely dosing the amounts of material employed in a process of forming plastic melts from granulates or granulate mixtures. To that end, the weighing container is filled with granulate up to a maximum fill level. When the shutter has been closed, the granulate is allowed to exit at the bottom end of the weighing container into a conveyer or a downstream equipment such as a plasticiser, while measuring the decrease in weight of the weighing container and its contents.

Below the shutter there has so far been provided a vertical inlet pipe, via which the granulate enters into the weighing container but which is not rigidly connected to the weighing container and therefore does not contribute to the measured weight of the latter. The weighing container is filled only up to a level at which the repose cone formed by the granulate is still below the lower end of the inlet pipe. In particular, this prevents that the granulate dams up in the inlet pipe and is supported laterally at the vertical walls of the inlet pipe and thereby compromises the result of the weight measurement.

Thus, even at maximum fill level, there is a certain dead space in the top end of the weighing container, and the dead space is not filled with granulate. Granulate dust and so-called "angel hair" may accumulate in this dead space. The term "angel hair" designates filament-like agglomerates of granulate dust which form due to collisions between dust particles when the granulate is conveyed in a vacuum conveying system. Due to their static charge, granulate dust and angel hair tend to adhere to the walls of the weighing container.

In those regions where the dust and the angel hair are not stripped-off by mechanical contact with the granulate particles, i.e. in particular in the dead space at the top end of the weighing container, dust and angel hair may accumulate until larger amounts of this material break away and drop into the granulate. Since this dust-like material is sometimes not melted completely in the extruder, it may result in defects in the plastic products formed from the granulate, in particular in the production of plastic films. It is therefore necessary to remove the dust adhering to the walls of the weighing container in regular intervals. In particular, the dust must be removed when there is a change in the type of the granulate material, in order to assure a uniform composition of the material.

It is time-consuming and cumbersome to remove the granulate dust manually.

SUMMARY OF THE INVENTION

It is an object of the invention to provide a method which permits to suppress the formation of the larger accumulations of dust-like plastics materials in the weighing container.

According to the invention, this object is achieved by closing-off the weighing container at the top side by a wall having a conical part that reaches directly up to the shutter, and by filling the weighing container with granulate up to the level of the shutter.

Since the weighing container is filled up to the level of the shutter, there will be no dead space in the weighing container, and no dust-like material can accumulate at the walls of such a dead space. On the other hand, since the part of the top closure wall which is adjacent to the shutter has a conical shape, the result of the weight measurement is not compromised, since the granulate cannot be laterally supported at this conical wall.

The invention further relates to a weighing system for plastics granulate, which system is suited for carrying out the method of the invention.

Advantageous details and further developments of the weighing system are indicated in the dependent claims. The cone angle of the conical part of the wall, i.e. the angle formed between this wall and the horizontal, is preferably between 20 and 70°, wherein the exact value may depend upon the type of the plastic granulate.

The conical part of the top closure wall may be separate from the weighing container and may be held at the shutter. Optionally, this conical part may however also be part of the weighing container.

BRIEF DESCRIPTION OF THE DRAWINGS

An embodiment example will now be described in conjunction with the drawings, wherein.

DETAILED DESCRIPTION

Figure 1:
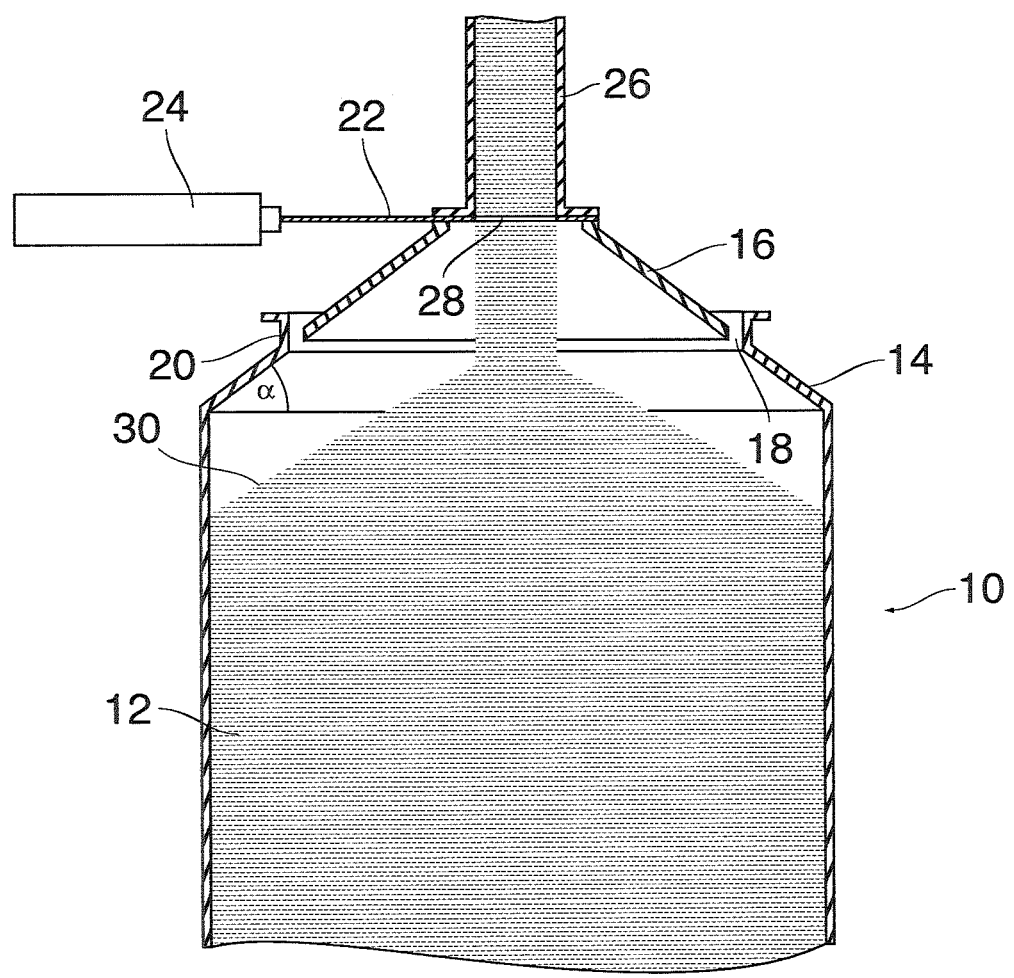
FIG. 1 is a vertical section of a part of a weighing system, comprising a weighing container for plastics granulate, during a fill operation.

FIG. 1 shows a top part of a weighing container 10 which, as a whole, has an essentially cylindrical shape and which is being filled with plastics granulates 12.

On the top side the weighing container 10 is closed-off by a conical wall which has an outer and lower part 14 rigidly connected to the weighing container, and an inner and upper part 16 which is separate from the weighing container 10. The two parts 14 and 16 are separated by a gap 18 which is surrounded by a collar 20 formed at the part 14. The top part 16 is disposed directly adjacent to a shutter 22 which is formed by a slide plate and an associated drive mechanism 24. The shutter 22 and the top part 16 of the closure wall are commonly held at a lower end of a supply tube 26 from which the granulate drops into the interior of the weighing container 10.

In the condition shown in FIG. 1, the shutter 22 is open, i.e. an opening 28 of the slide plate is aligned with the internal cross-section of the supply tube 26, so that the granulate drops into the weighing container 10 and forms a repose cone 30.

The cone angle α of the conical closure wall formed by the parts 14 and 16 of the weighing container is larger than the repose angle of the granulate, i.e. the angle of inclination of the repose cone 30, so that, when the fill level in the container increases, the granulate can completely fill also the top part of the weighing container 10 that is limited by the conical closure wall.

Figure 2:
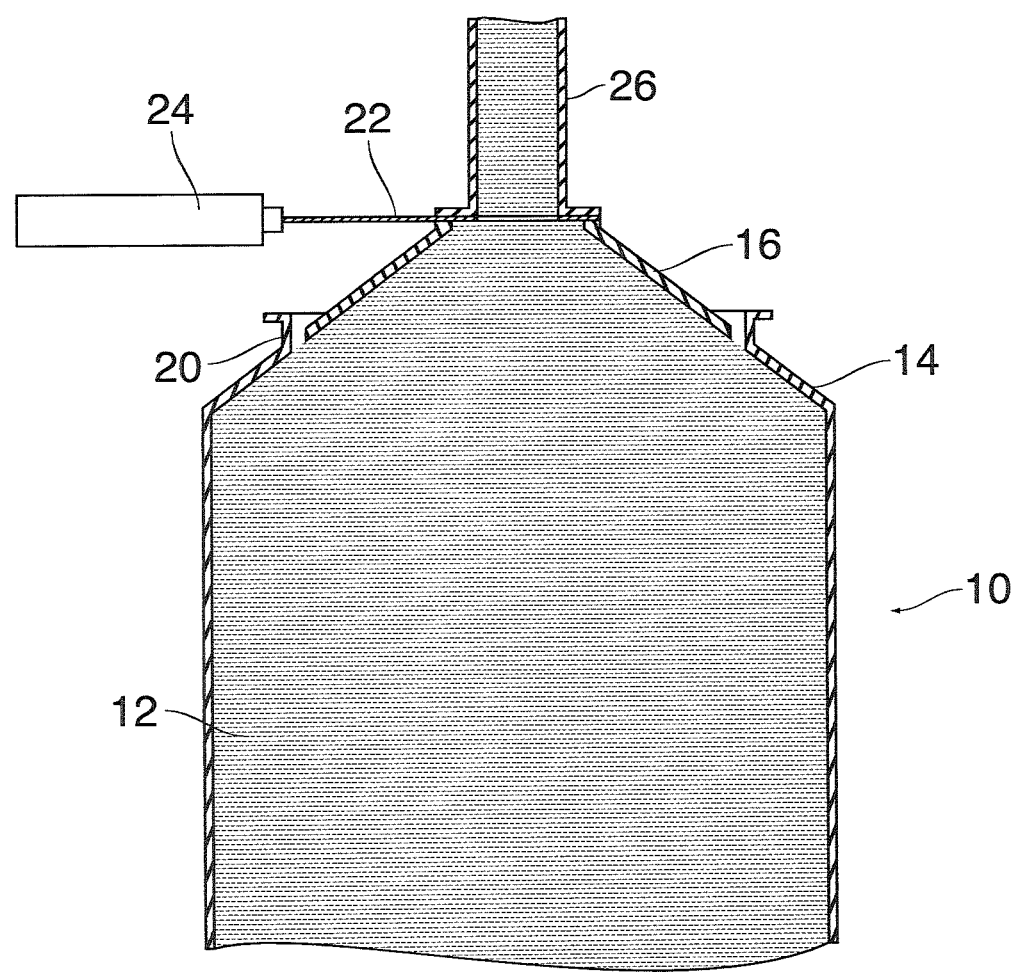
FIG. 2 shows the weighing container in a state completely filled with granulate.

FIG. 2 shows the condition where the weighing container has completely been filled with granulate 12 up to the level of the shutter 22. In this condition, the interior of the weighing container, including the conical top part, is filled with granulate practically completely, so that practically no dead space remains in the weighing container. Now, in this condition, the shutter 22 is closed, as has been shown in FIG. 3. Any possible granulate dust that may adhere to the slide plate of the shutter 22 due to electrostatic charge will be stripped off by the horizontal movement of the slide plate.

The bottom end of the weighing container 10, which has not been shown here, is funnel-shaped and is connected to a conveyer with which the material is discharged continuously. As long as the shutter is closed, the fill level of the granulate in the weighing container 10 decreases, since no further granulate is fed via the supply tube 26. Thus, as has been shown in FIG. 4, an empty space forms in the conical top part of the weighing container 10, and this space becomes larger while the granulate exits at the bottom end of the weighing container.

The weighing container 10 is supported on a weighing cell with which the decrease in weight of the container and the granulate 12 contained therein is measured continuously. In this way, the amount of material that leaves the weighing container can be determined with high precision.

Figure 3:
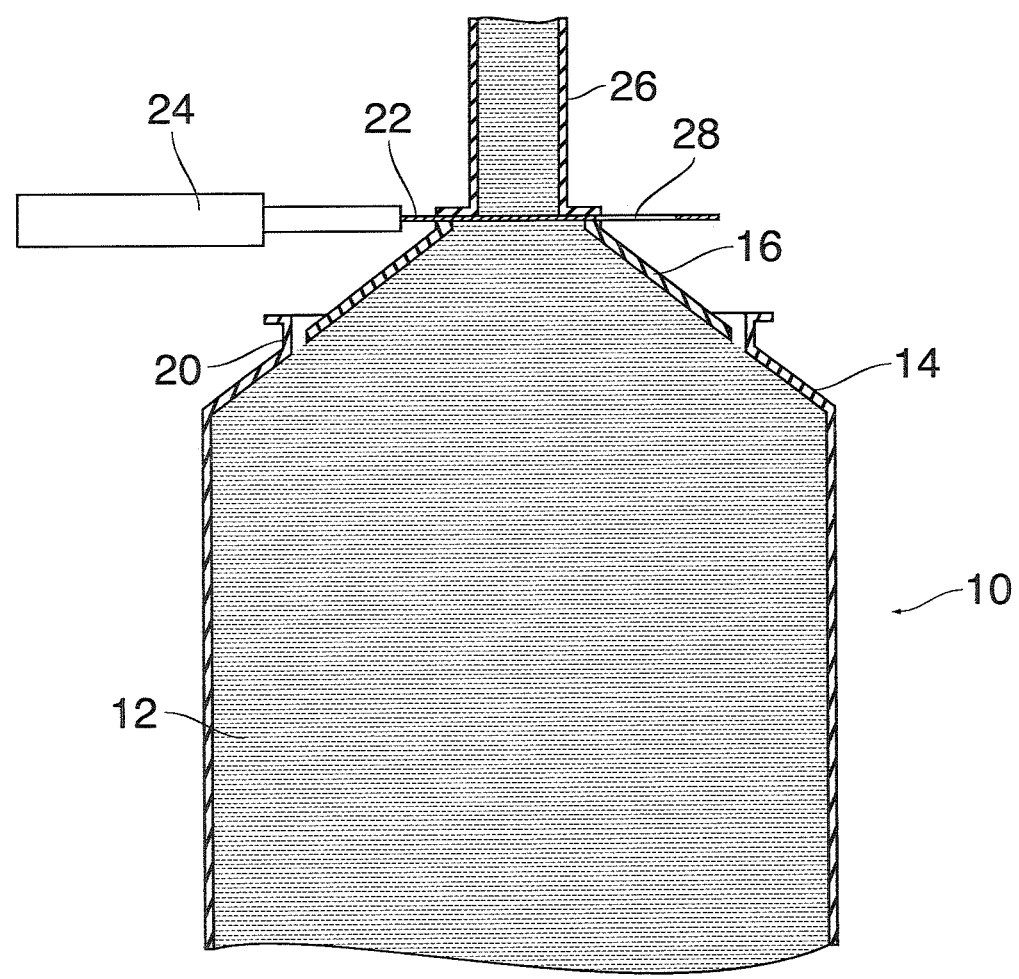
FIG. 3 shows the weighing container in a condition when a shutter has been closed.

The cone angle α of the parts 14, 16 of the top closure wall of the weighing container has been selected such that the granulate that has been in contact with the part 16 in the condition shown in FIG. 3 can drop down freely without being restrained in its downward movement by the conical part 16. In this way, it is assured that the entire weight of the granulate, including the portion that is accommodated within the part 16, always rests on the weighing cell, so that the result of the weight measurement is not compromised.

When a certain amount of granulate has exited the weighing container 10, the shutter 22 is opened again, so that a new fill cycle may start.

Figure 4:
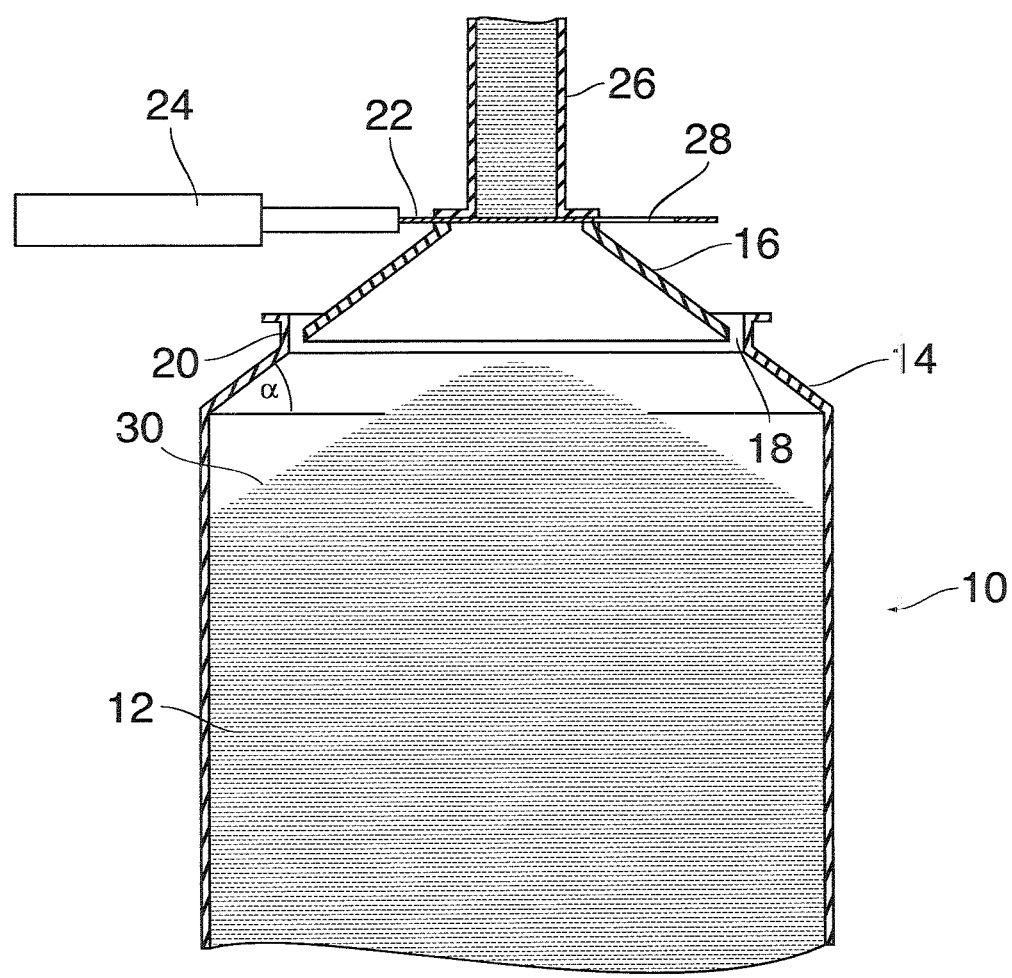
FIG. 4 shows the weighing container during an emptying process.

In a transition phase between the condition shown in FIG. 3 and the condition shown in FIG. 4 the granulate 12 will gradually sink downward in the weighing container 10, and granulate particles will move along the internal wall of the part 14 and the part 16 of the closure wall, so that any dust that may adhere to these walls will be stripped-off.

Thus, the accumulation of larger amounts of dust or angel hair in the top part of the weighing container 10 may be prevented by performing, at least in certain time intervals, fill cycles in which the entire interior of the weighing container 10 is filled with granulate up to the level of the shutter 22, as shown in FIGS. 2 and 3. In between, it is possible to perform fill cycles in which the interior of the weighing container is filled only up to a lower level.

When the type of granulate is changed, the last fill cycle before the weighing container is emptied completely should in any case be performed in the manner shown in FIGS. 2 and 3 in order to minimize the amount of dust and angel hair that remains in the weighing container 10 and could therefore mix with the new granulate material. In most cases it is possible in this way to completely dispense with a manual cleaning of the weighing container and the part 16 of the closure wall. Only in those cases in which the granulate type is changed from a very dark material to a brighter material, a manual cleaning may be useful in order to avoid a perceptible change in the colour of the plastics.

What is claimed is:

1. A method of filling a stationary weighing container for plastics granulate, comprising the steps of:
    closing off the weighing container at a top side thereof by a wall having a conical part that reaches directly up to a shutter,
    dropping the granulate from a supply tube into the weighing container via the shutter,
    filling the weighing container with granulate up to the level of the shutter, and
    discharging the granulate from a lower open end of the weighing container.

2. The method according to claim 1, wherein the conical part has a cone angle which is selected as dependent upon the consistency of the granulate.

3. The method according to claim 2, wherein the granulate in the weighing container has an upper surface with an angle of repose, and the cone angle is larger than the angle of repose of the granulate.

4. A weighing system for carrying out a method of filling a stationary weighing container for plastics granulate, with the steps of closing off the weighing container at a top side thereof by a wall having a conical part that reaches directly up to a shutter, dropping the granulate from a supply tube into the weighing container via the shutter, filling the weighing container with granulate up to the level of the shutter and removing the granulate from a lower open end of the weighing container, the weighing system, comprising:
    a weighing container having an upper open end for receiving granulate, and a lower open end for discharging granulate therefrom,
    a supply tube opening out into the upper open end of the weighing container via a shutter, and
    a wall having a conical part which closes off a top side of the weighing container, with the conical part of the wall reaching directly up to the shutter.

5. The weighing system according to claim 4, wherein the weighing container has a top wall with a conical configuration in its entirety.

6. The weighing system according to claim 4, wherein the conical part of the wall reaching up to the shutter is separate from the weighing container and is held independently of the weighing container.

* * * * *